United States Patent [19]

Loeber

[11] Patent Number: 5,163,700
[45] Date of Patent: Nov. 17, 1992

[54] DUAL REAR AXLE ASSEMBLY FOR LARGE VEHICLES

[75] Inventor: Frederick W. Loeber, Tulsa, Okla.
[73] Assignee: Terex Corporation, Green Bay, Wis.
[21] Appl. No.: 732,581
[22] Filed: Jul. 18, 1991

Related U.S. Application Data

[63] Continuation-in-part of Ser. No. 638,690, Jan. 8, 1991.

[51] Int. Cl.⁵ .............................................. B60G 5/00
[52] U.S. Cl. ............................. 280/683; 180/24.01; 180/905; 280/676
[58] Field of Search ............... 280/676, 683, 685, 684, 280/688, 687, 91, 689, 721, 723; 180/22, 24.01, 24.06, 24.11, 65.5

[56] References Cited

U.S. PATENT DOCUMENTS

| | | | |
|---|---|---|---|
| 1,545,067 | 7/1925 | Robbins | 280/676 |
| 1,565,527 | 12/1925 | Templin | 180/24.11 |
| 1,801,726 | 4/1931 | Dalrymple | 180/24.11 |
| 3,055,448 | 9/1962 | Fagel | 180/65.5 |
| 3,171,668 | 3/1965 | Willetts | 280/684 |
| 4,717,170 | 1/1985 | Mounier-Poulat | 280/683 |

FOREIGN PATENT DOCUMENTS

| | | | |
|---|---|---|---|
| 49502 | 3/1983 | Japan | 280/676 |
| 435326 | 9/1935 | United Kingdom | 280/91 |

Primary Examiner—Karin L. Tyson
Attorney, Agent, or Firm—Head & Johnson

[57] ABSTRACT

A dual axle assembly for large vehicles having an elongated vehicle frame, a forward axle housing, a first torque arm rearwardly extending from the forward axle housing, a rearward axle housing having a second torque arm forwardly extending from the rearward axle housing, the first and second torque arms being generally parallel to and spaced apart from each other, the first torque arm having an outer end pivotally affixed to the rearward axle housing and the second torque arm having an outer end pivotally affixed to the forward axle housing, spring supports extending between the forward and rearward axle housings to the vehicle, and a wheel structure supported at each opposed ends of each axle housing being pivotal in vertical planes about an axis drawn through the points of pivotal attachments of the torque arms.

6 Claims, 4 Drawing Sheets

DUAL REAR AXLE ASSEMBLY FOR LARGE VEHICLES

CROSS REFERENCE TO RELATED APPLICATION

This a continuation-in-part of application Ser. No. 07/638,690 entitled "Dual Steerable Axle Arrangement For Large Vehicles" filed Jan. 8, 1991.

SUMMARY OF THE INVENTION

The typical large, heavy-load carrying vehicle has two rear axles that are in vertical planes fixed relative to the truck frame longitudinal axis and a single front axle with wheel assemblies pivoted to the outer end of each. The truck is steered by simultaneously pivoting the front wheel assemblies. The present disclosure is an improved dual rear axle assembly for large, heavy-load carrying vehicles.

One of the problems with dual wheel assemblies is that of providing spring support between the assembly and the truck frame so that the weight borne by all four wheel structures in the assembly remain substantially constant when one or more of the four wheels is displaced upwardly or downwardly by changes in elevation of the surface over which the vehicle travels.

Another problem with the dual axle assemblies as presently known is that of linking the assembly to the truck frame. One advantage of the present disclosure is that the acceleration and braking action of the wheels forming the assembly cancels so that torque is not applied from the assembly to the vehicle frame, permitting the use of a simplified drag link arrangement for securing the assembly to the frame.

The dual rear axle assembly for large vehicles of this disclosure is for use with an elongated vertical frame having a longitudinal frame axis. A forward axle housing is supported below the frame. In like manner, a rearward axle housing is supported below the frame rearwardly of and parallel to the forward axle housing.

A first torque arm is secured to the forward axle housing and extends rearwardly therefrom. The outer end of the first torque arm is pivotally affixed to the rearward axle housing.

A second torque arm is affixed to the rearward axle housing and extends forwardly thereof, the forward end being pivotally affixed to the forward axle housing. The torque arms are spaced apart from each other so that the torque arms and axle housings form a rectangular arrangement.

Spring support structures are affixed to each of the axle housings for supporting the truck frame. The spring support structures may be in the form of telescopically compressible strut members.

A wheel structure is supported at the outer end of each of the forward and rearward axle housings. A tire or dual tires are rotatably supported to each of the wheel structures.

By the use of two paralleled torque arms, each being affixed to one of the axle housings and each being pivotally secured at its outer end to the opposed axle housing, a system is provided having the characteristic that acceleration or braking torque in the assembly cancels with respect to the frame. That is, when braking is applied to the four wheels in the assembly, the torque normally encountered in an axle is absorbed within the assembly itself and there is no significant torque transmitted from the assembly to the frame. For this reason, linkage of the assembly to the vehicle frame can be accomplished by a drag link that can be pivotally secured at each end, that is, the drag link is not required to counteract torque. This is contrasted with the typical linkage required from a frame to a rear axle arrangement that must accept both acceleration torque and braking torque.

The dual axle assembly supports a vehicle frame by means of spring supports that may be in the form of telescopically compressible strut members. In the preferred arrangement four strut members are employed, each being pivotally attached at its upper end to the frame. One pair of strut members is pivotally attached at their lower ends to the forward axle housing, and another pair of strut members is pivotally attached at their lower ends to the rearward axle housing. The strut members support the frame above the dual axle assembly.

The dual axle assembly has the characteristic of permitting free pivotation of the axles relative to each other and to the vehicle frame so that the upward displacement of one of the four wheel structures, such as when encountering a bump in the surface over which the vehicle is driven, does not upwardly displace the other three wheel assemblies. An axis of oscillation of the forward and rear axle housings relative to each other is provided by an imaginary line drawn through the points of pivotal attachment of the first and second torque arms to the forward and rearward axle housings.

A better understanding of the invention will be had by reference to the following description and claims, taken in conjunction with the attached drawings.

DESCRIPTIONS OF THE DRAWINGS

DESCRIPTION OF THE PREFERRED EMBODIMENTS

The invention will be described as it is applicable to a vehicle, such as a large truck, it being understood that the vehicle may be any type of heavy machine for traveling on the earth's surface.

First, a dual axle assembly with steerable wheels will be described.

Figure 1:
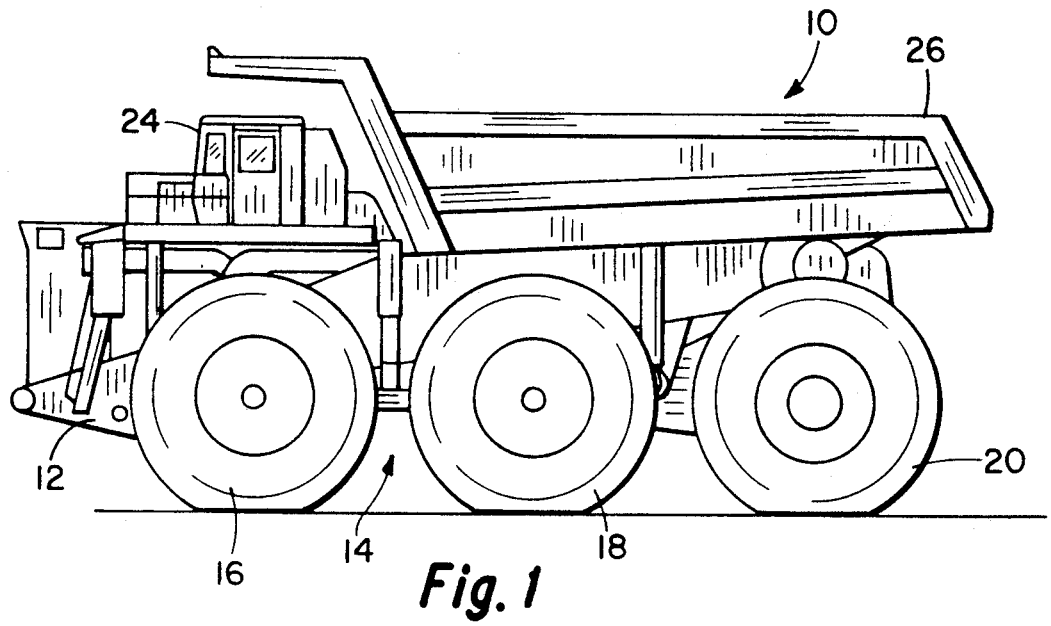
FIG. 1 is an elevational view of a truck exemplifying a type of large, heavy-load bearing vehicle to which the invention of this disclosure pertains when a two axle assembly is used in the front of the vehicle and in which the assembly includes steerable wheels.

Referring to the drawings and first to FIG. 1, a typical heavy duty truck is illustrated in FIG. 1 and identified by the numeral 10. The truck includes a frame 12 and a dual axle front steerage assembly, generally indicated by the numeral 14, which will be described in detail hereinafter. The front steerage assembly 14 includes four tires, and in FIG. 1 front left tire 16 is seen as well as left rear steerable tire 18. One of the truck rear tires 20 is seen, tire 20 being mounted on a non-steerable rear axle.

The truck 10 includes a cab 24 wherein the operator sits and a dump bed 26 that is illustrative only, as the principles of this disclosure are applicable to a truck or other machine of any configuration or purpose.

Figure 2:
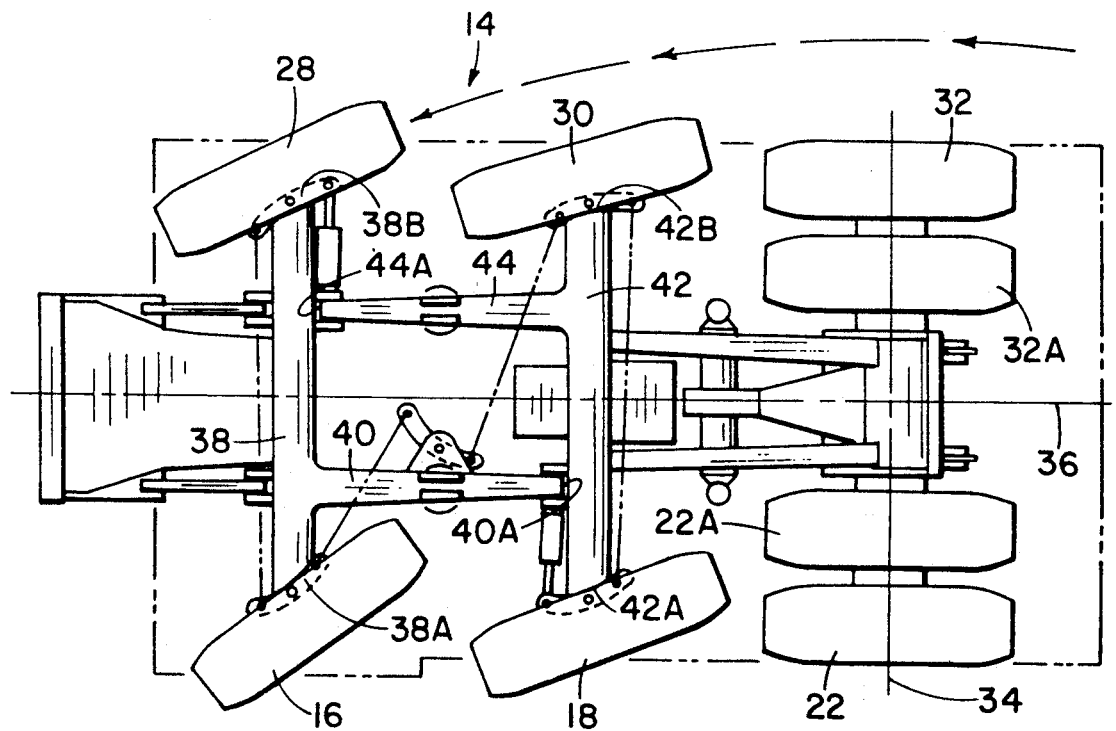
FIG. 2 is a diagrammatic view of the dual axle steerable assembly and the single rear axle assembly of the heavy-load bearing vehicle of FIG. 1 as would be seen looking down on the axle assemblies with the vehicle frame removed.
Figure 3:
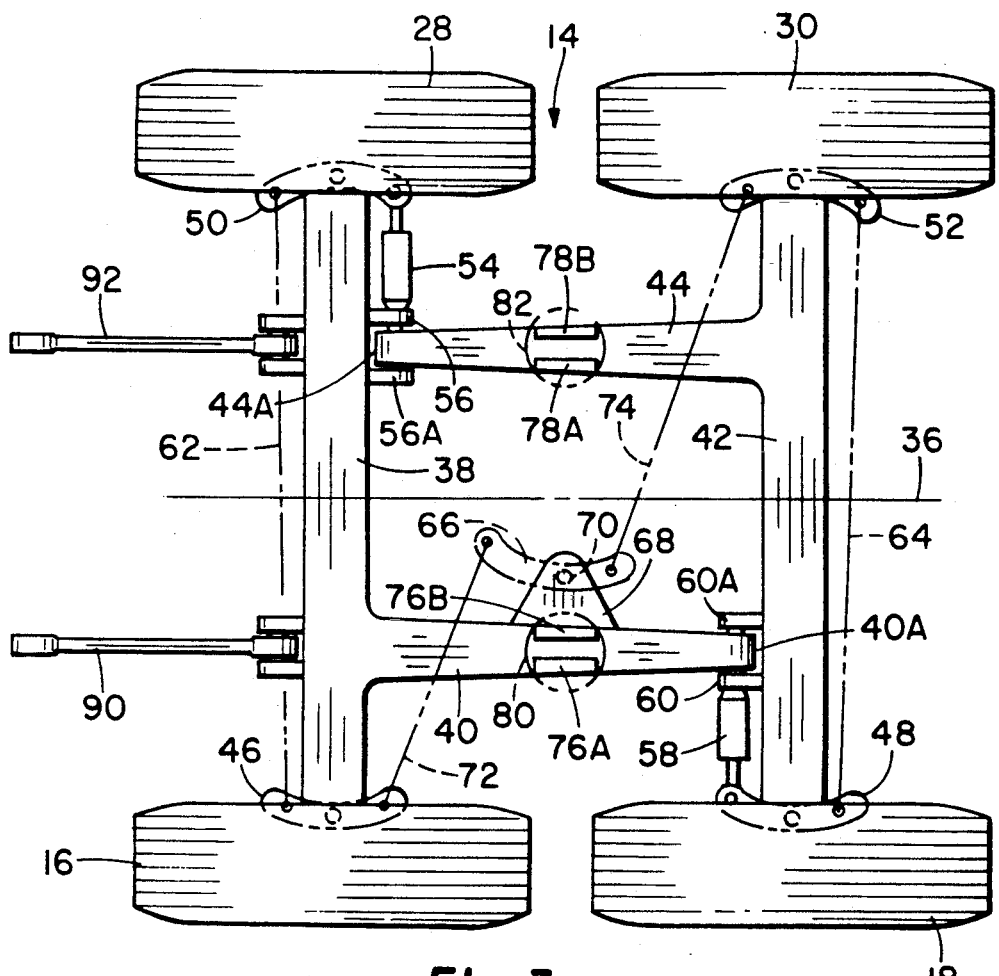
FIG. 3 is another diagrammatic view, slightly enlarged, of the dual axle steerable assembly.

Referring now to FIGS. 2 and 3, the general principles of this invention will be described. FIG. 2 is a top plan view of the wheel assemblies of the truck of FIG. 1, that is, looking down on the wheel assemblies with frame 12, cab 24, dump bed 26, etc. of the truck removed therefrom. Steerable front and rear left tires 16 and 18 are seen, as well as rear tire 22. FIG. 2 also shows the opposed tires, that is, a steerable front right tire 28, a steerable rear right tire 30, and a truck rear right tire 32. The truck rear tires 22 and 32 are illustrated as dual tires with inside tires 22A and 32A respectively. The rear tires 22, 22A, 32, and 32A are supported about a common rear axle axis 34 that is generally supported in a vertical plane that is perpendicular to the vertical plane of truck longitudinal axis 36.

This disclosure is concerned with dual axle assemblies for use with large vehicles. In the first embodiment to be described the dual axle assembly, generally indicated by the numeral 13, is steerable, and the use of a dual rear axle non-steerable assembly will be described subsequently. Typically, a rear dual axle assembly provides the truck motive power. However, it is understood that the principles of this invention can be applied to a truck in which part or all of the wheel assemblies provide motive power, but the invention will be first described wherein the dual axle system is steerable and is used as a part of a vehicle wherein the motive power is supplied only by rear wheels that do not form a part of the dual axle assembly.

A forward axle beam 38 has opposed ends 38A and 38B. A wheel assembly, to be described subsequently, is affixed to forward axle beam end 38A to support tire 16 and in like manner, a wheel assembly is affixed to the axle beam end 38B to support steerable front tire 28.

Secured to forward axle beam 38 in a non-rotatable, that is, fixed, relationship is a rearwardly extending first torque arm 40 having an outer end 40A.

A rearward axle beam 42 has opposed ends 42A and 42B that rotatably receive wheel assemblies, not shown, that support rear left tire 18 and rear right tire 30. Secured to the rear axle beam 42 in a non-pivotal relationship is a second torque arm 44 having an outer end 44A.

The torque arms 40 and 44 are thereby spaced apart from each other and are on either side of the truck frame center line or longitudinal axis 36.

FIG. 3 shows the dual axle steerable assembly of FIG. 2 with the wheel assemblies and tires in line for forward movement of the truck in the direction of its longitudinal axis 36.

FIG. 3 illustrates a simplified embodiment of a linkage system for simultaneously steerably pivoting each of the wheel assemblies that support tires 16, 18, 28 and 30. Affixed to the wheel assemblies at the outer ends of each of the axle beams 38 and 42 are wheel assembly steerage plates 46, 48, 50 and 52, that is, each of the plates 46, 48, 50 and 52 rotate about a vertical axis to rotate the wheels having tires 16, 18, 28, and 30. A hydraulic cylinder/piston 54 is connected between the assembly superstructure, such as by a bracket 56 extending from front axle beam 38, and the wheel assembly steerage plate 50. In like manner, a cylinder/piston 58 extends from a bracket 60 affixed to rearward axle beam 42 to wheel assembly steerage plate 48. A tie rod 62 rotatably interconnects front wheel assembly steerage plates 46 and 50 and in like manner, a tie rod 64 rotatably interconnects rear wheel assembly steerage plates 52 and 48. A bell crank 66 is pivotally supported to the assembly, such as by a bracket 68 affixed to and extending from first torque arm 40. Bell crank 66 is rotatable about a vertical axis through pin 70. A tie bar 72 interconnects the wheel assembly steerage plate 46 with bell crank 66 and a second tie bar 74 interconnects bell crank 66 with wheel assembly steerage plate 52.

Steering is achieved by control of hydraulic cylinder/pistons 54 and 58 in unison, and the linkages provided by tie rods 62 and 64, bell crank 66, tie bars 72 and 74 serve to simultaneously transmit pivotal action to the wheel assembly steerage plates 46, 48, 50 and 52. While only two cylinder/pistons are shown, in actual practice four such cylinder/pistons may be employed, one for each wheel and all functioning in unison.

The outer end 40A of first torque arm 40 is pivotally secured to rearward axle beam 42 as previously stated. This can be achieved such as by means of a second bracket 60A spaced from the first mentioned bracket 60 with a pin therethrough that pivotally receives the end of first torque arm 40. This is an over simplified indication of the pivotal relationship between torque arm 40 and axle beam 42. In the preferred arrangement, as will be discussed subsequently, the pivotal relationship should be a spherical bearing or bushing arrangement to allow pivotation about more than one axis. In a similar illustrated arrangement, bracket 56 extending from forward axle beam 38 is opposed by a mating bracket 56A to pivotally receive the forward end 44A of second torque arm 44 and is intended to be illustrative of a pivotal relationship wherein the pivotation is preferably permitted by a spherical bearing or bushing connection.

Figure 4:
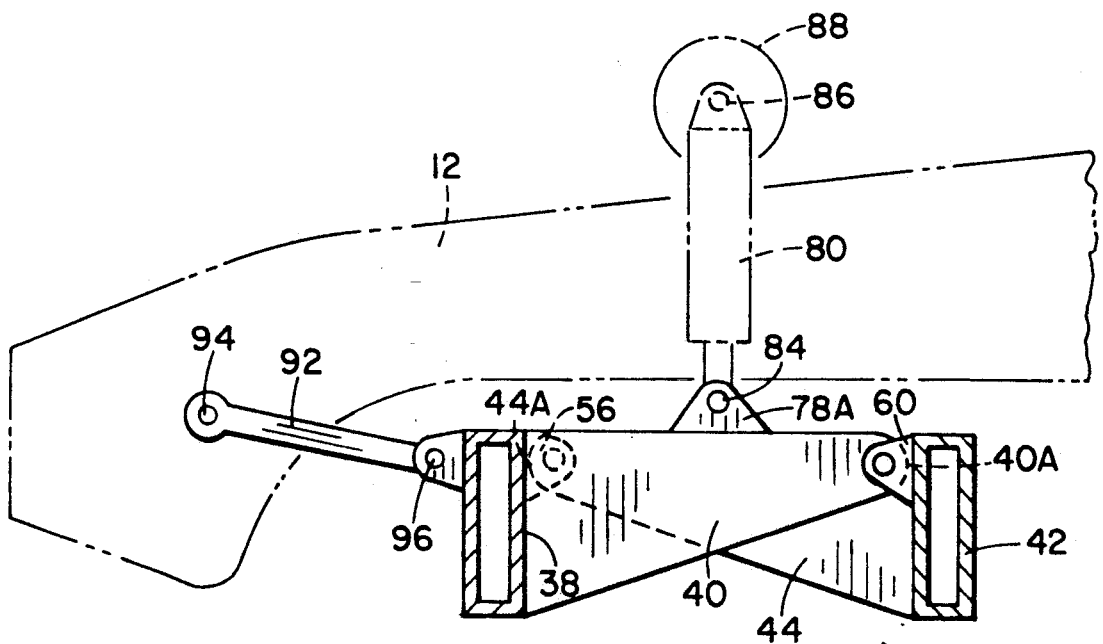
FIG. 4 is a fragmentary cross-sectional view of a portion of a vehicle frame and the dual axle assembly showing means to spring support the vehicle frame above the dual axle assembly.

FIG. 4 shows a diagrammatic cross-sectional view of forward axle beam 38 and rearward axle beam 42 positioned below truck frame 12. First torque arm 40 extends from the forward axle beam 38 and the rearward end 40A thereof is pivotally secured to rearward axle beam 42. In corollary, but opposite manner, the second torque arm 44 is affixed to rearward axle beam 42 and the forward end 44A is pivotally secured to the forward axle beam 38. The wheel assemblies, steerage plates, steering linkages and tires are not shown in FIG. 4.

As shown in FIG. 3, first torque arm 40 has load brackets 76A and 76B extending upwardly therefrom at a point midway between forward axle beam 38 and rearward axle beam 42. In like manner, second torque arm 44 has load plates 78A and 78B affixed to and extending upwardly therefrom at a point midway between axle beams 38 and 42. These load plates 76A, 76B, 78A and 78B are emblematic of an apparatus for spring supporting the dual axle front steerage assembly 14 to truck frame 12. This spring support can be achieved in a variety of ways. In a preferred way and as illustrated in FIG. 4, the spring support is in the form of a telescopically compressible strut member 80. FIG. 4 shows only one such strut member, however, such strut members are indicated diagrammatically in FIG. 3, the second strut member being indicated by the numeral 82. These strut members 80 and 82 transfer the load supported by frame 12 onto dual axle front steerage assembly 14. One of the unique concepts of this disclosure is the fact that only two such spring support mechanisms, such as telescopically compressible strut members 80 and 82, are required to transfer the load to a four wheel assembly in a manner such that the load on each of the four wheels remain substantially constant at all times. In FIG. 4, the first telescopically compressible strut member 80 is pivotally secured about pin 84 to load plates 78, only plate 78A being seen, while the upper end of telescopically compressible member 80 is secured about a pin 86 that extends from a structural member diagrammatically illustrated by the numeral 88 that, in turn, is secured to frame 12 so that thereby the load of the frame is transmitted to the dual axle steerable assembly 14.

While the use of two struts 80 and 82 as shown in FIGS. 3 and 4 has unique features as above described, the system can be practiced using four struts extending between the vehicle frame and axle beams 38 and 42 (not shown). These can be of the nitrogen over oil type, or the like, with the struts connected together with piping (not shown) so that the force applied to support the vehicle frame and load carried by the vehicle is equally distributed to each of the four struts. With this arrangement the structural requirements of the torque arms are reduced.

To maintain the dual axle front steerage assembly 14 in position below frame 12 a pair of drag links 90 and 92 are employed as seen in FIGS. 3 and 4. The forward ends of each of the drag links 90 and 92 are affixed to the frame, such as about pin 94 in FIG. 4. The rearward end of each of the drag links is affixed to the forward axle beam 38, such as about pin 96. The use of a pair of drag links 90 and 92 is emblematic of the fact that the dual axle front steerage assembly 14 does not transmit rotational torque from itself to frame 12. Stating it another way, an important characteristic of the dual axle steerage assembly employing torque arms 40 and 44 is that braking torque is canceled within the assembly and such rotational braking torque is not transmitted to the frame. Therefore, there is no requirement that a pivoting mechanism be provided extending from the frame to the steerage assembly to counteract rotational torque. The usual truck signle axle front steerage arrangement transmits braking torque to the frame and such torque must be counteracted, usually by the use of parallelogram type drag link assemblies not required in the present case, which permits the use of a single pair of spaced apart drag links 90 and 92. This is not to say that the invention could not be practiced utilizing a parallelogram or other type of pivotation between assembly 14 and frame 12, and in some instances such may be desirable, but it is not necessary to counteract braking torque.

The dual axle assembly of FIGS. 1 through 4 provides an axis of oscillation through the bearing at the outer end of each of the torque arms in a manner to be described subsequently with reference to FIG. 6.

While not shown in FIGS. 3 or 4, but necessary to maintain steerable axle assembly 14 properly positioned beneath truck frame 12, lateral links are required. Such lateral links function similarly to drag links 90 and 92 but are positioned in vertical planes perpendicular to the vertical plane of truck longitudinal axis 36. Each such lateral link is pivotally attached at one end to truck frame 12 and at the other end to axle assembly 14 to permit the axle assembly to move vertically with respect to the frame. The use of lateral links is well known in the design of truck suspension systems.

The dual axle front steerage assembly described herein has advantages over the known multi-axle steerage assemblies previously employed. One advantage is that the assembly provides an axis of oscillation that extends through the pivotal joints 40A and 44A. When any one of the four wheels making up the assembly rises elevationaly as a result of encountering an elevated object or uneven ground on which the truck moves, the assembly pivots about axis of oscillation. This pivotal arrangement ensures that weight supported by the assembly is distributed equally to all four wheels at all times. The fact that only two spring load support mechanisms, such as first and second telescopically compressible strut members 80 and 82, are required means that weight is always properly distributed from the frame to all wheels of the assembly.

Figure 7:
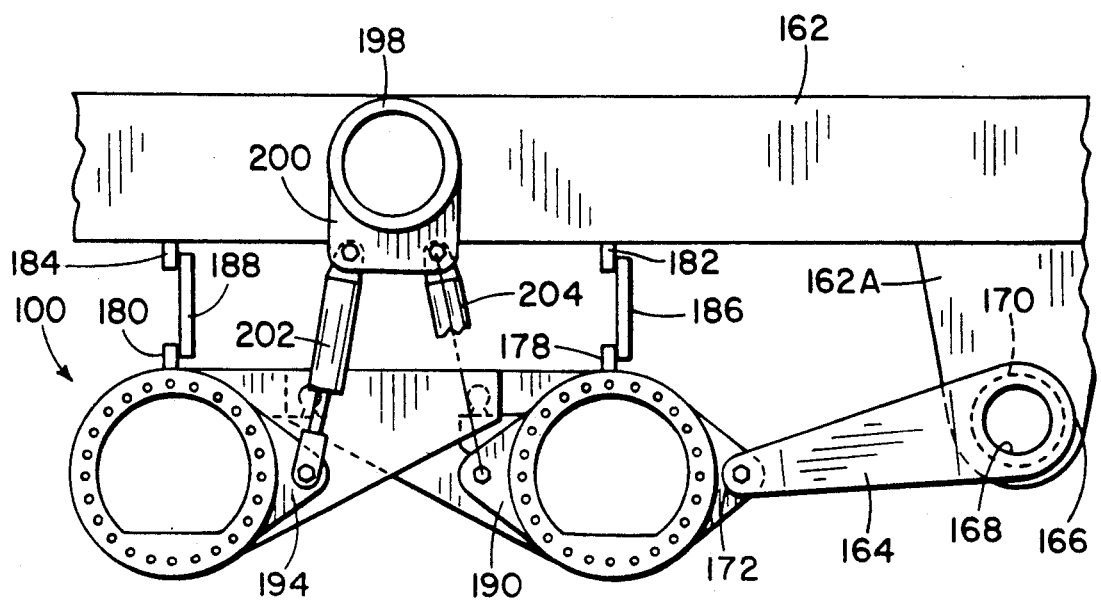
FIG. 7 is an elevational side view shown without axles, wheel assemblies and tires, and showing a portion of a truck frame and means of supporting the dual axle assembly under the truck frame and the suspension system by which the dual axle assembly supports at least a substantial portion of the weight of the truck frame.
Figure 5:
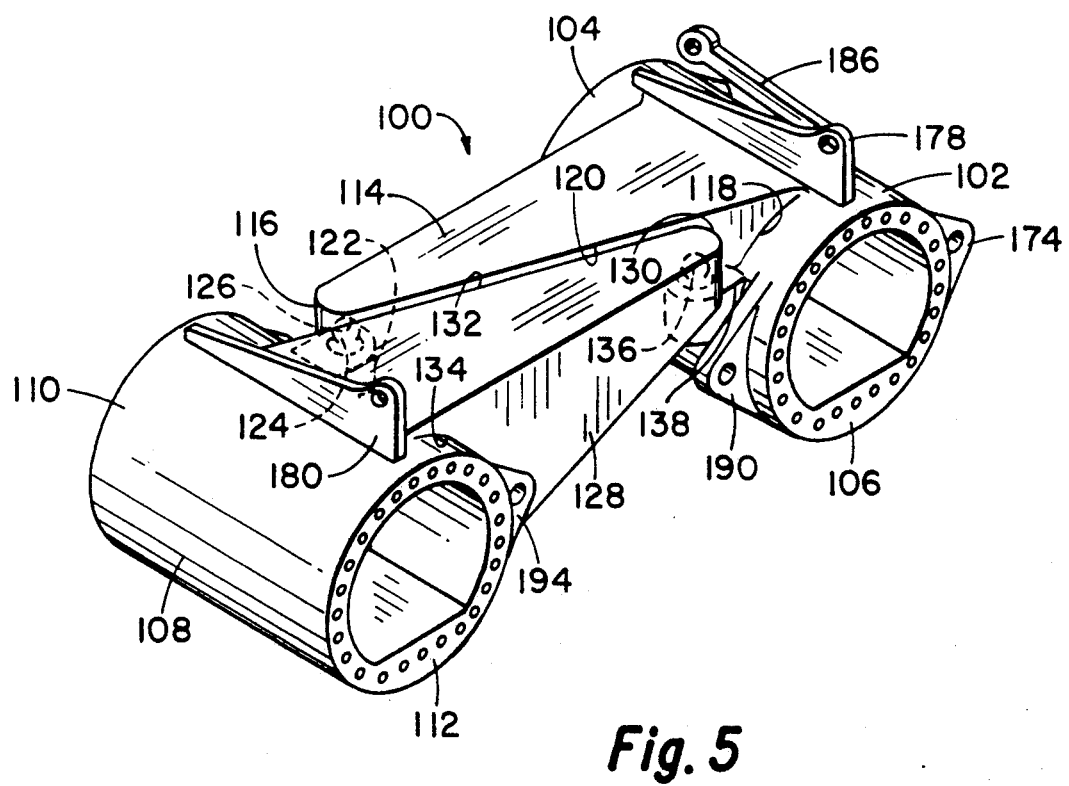
FIG. 5 is an isometric fragmentary view of a dual axle assembly for large vehicles incorporating the principles of this disclosure and showing the system employed for providing an assembly having large cylindrical axle housings adaptable to receive electric drives therein of the type commonly employed on large heavy-duty off-road vehicles.
Figure 6:
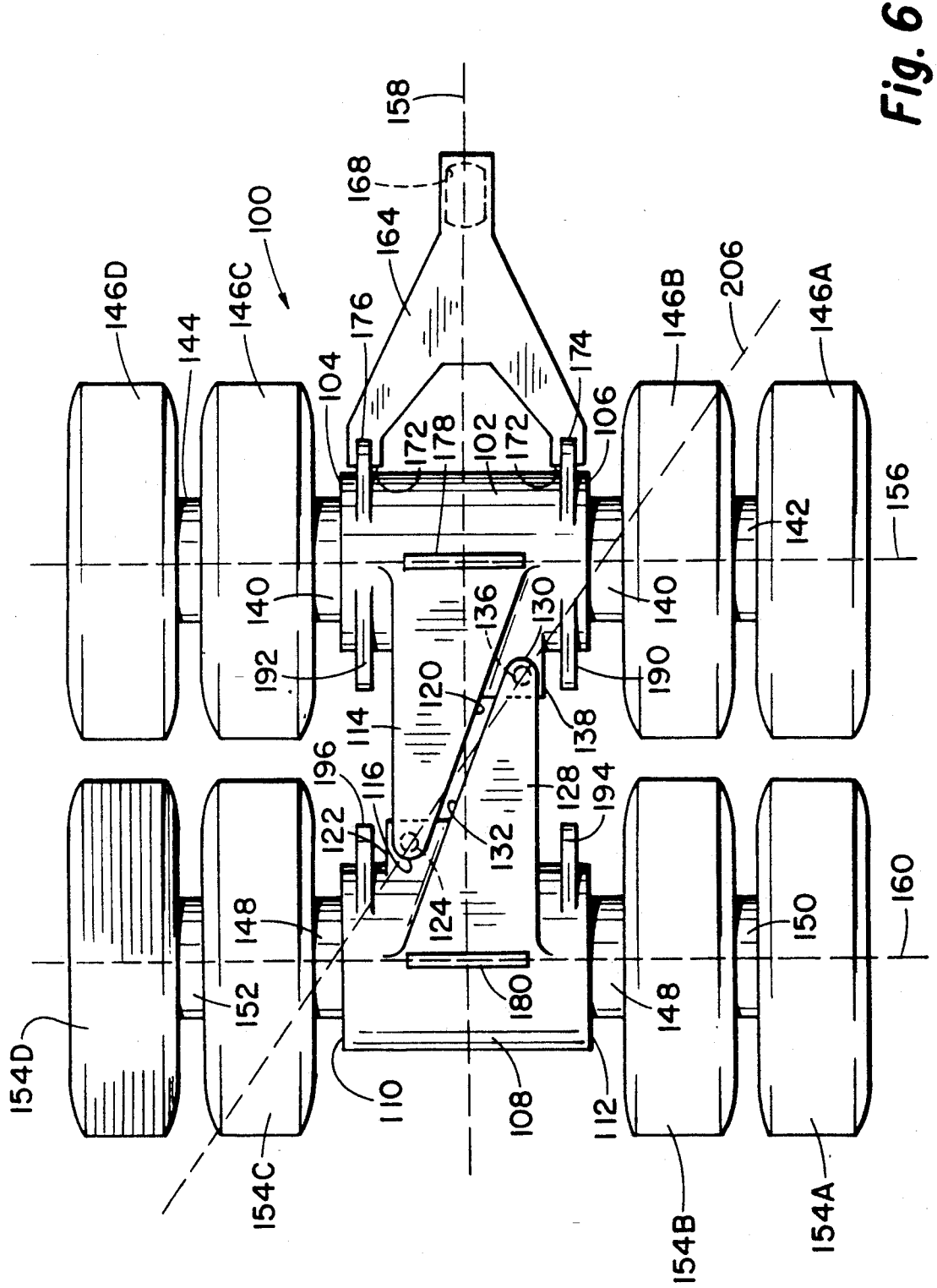
FIG. 6 is a top view of the dual axle assembly of FIG. 5 and shows axles extending from the forward and rearward axle housings with wheels and tires mounted thereon and discloses a drag link for attachment of the assembly to the frame of a large vehicle.

Referring to FIGS. 5, 6 and 7 the embodiment of the basic concepts of this invention for use in providing a dual rear axle non-steerable assembly for large vehicles is illustrated and will now be described. FIG. 5 is an isometric view of the basic elements making up a dual rear axle assembly. The assembly is indicated generally by the numeral 100 and includes a forward axle housing 102 having opposed ends 104 and 106. The axle housing 102 is of the type that is a substantially large diameter tubular member designed to house electric drive mechanisms therein of the type commonly employed on large off-road heavy-load carrying vehicles. The axle housing 102 is by way of example only, as the actual housing could be of the type formed of a beam or other type of axle housing commonly employed in large vehicles. The principles of this invention are particularly applicable when axle housing 102 is of the large diameter type, but the invention is not so limited. The second important element in the assembly is a rearward axle housing 108 having opposed ends 110 and 112. Axle housings 102 and 108 are substantially identical to each other.

A first torque arm 114 is affixed to the forward axle housing 102 and extends rearwardly therefrom. The first torque arm has an outer end 116. The inner end 118 of first torque arm 114 is affixed rigidly to forward axle housing 102. Torque arm 114 is preferably, as illustrated, of generally right triangular configuration taken in horizontal planes so that the inner end 118 is considered the base of such triangular configuration. First torque arm 114 has an inner sidewall 120 that is the hypotenuse of such imaginary right triangular configuration.

The rearward axle housing 108 has a trunnion portion 122 that supports a ball 124. The outer end 116 of first torque arm 114 has a ball coupling portion 126 so that the outer end of first torque arm 114 is pivotally attached to the rearward axle housing 108.

A second torque arm 128 is preferably substantially identical to the first torque arm 114 and has an outer end 130. The second torque arm is preferably of right triangular configuration in horizontal planes providing an inner sidewall 132 that is, in effect, the hypotenuse of the imaginary triangular configuration. Sidewall 120 of first torque arm 114 is closely spaced from and paralleled to sidewall 132 of second torque arm 128.

The second torque arm inner end 134 is rigidly affixed to the rearward axle housing 108. The outer end 130 of second torque arm 128 is pivotally affixed to a ball member 136 supported to trunnion portion 138 extending from the forward axle housing in the same way that the first torque arm is pivotally affixed to the rearward axle housing.

FIG. 6 shows a top plane view of the dual rear axle assembly 100 as used for a vehicle. In FIG. 6 the forward axle housing 102 supports a forward axle 140. Axle 140 is of the type that is driven by electrical motor means contained within tubular forward axle housing 102. At each outer end of the forward axle there are wheel assemblies 142 and 144 that support wheels and tires 146A through 146D, that is, four tires are supported by axle 140 extending from opposed ends of forward axle housing 102.

In like manner, the rearward axle housing 108 has extending thereon a rearward axle 148 supporting wheel assemblies 150 and 152 that support wheels and tires 154A through 154D. The forward axle 140 has a horizontal axis 156 that is perpendicular to the plane of the truck frame longitudinal axis 158. In like manner, the rearward axle 148 has an axis 160 that is perpendicular to the vertical plane of the truck longitudinal axis 158. The axii 156 and 160 are supported paralleled to each other by the assembly 100, but in a manner wherein axles 140 and 148 may independently tilt in vertical planes.

The dual axle assembly 100 has three main functions, that is: first, to support a frame 162 of a vehicle and loads carried by the vehicle frame; second, to provide motive power to move the vehicle; and, third, to provide braking for the vehicle. Assembly 100 is secured in position beneath frame 162 by three basic mechanisms. The first is a drag link 164 shown in FIGS. 6 and 7 but not in FIG. 5. The drag link 164 has a forward end 166 that is pivotally connected to a portion 162A of the truck frame. The truck frame is shown diagrammatically in FIG. 7 and identified by numeral 162. The typical truck frame is a very carefully engineered and contoured piece of equipment, and FIG. 7 merely shows the truck frame emblematically as a structure that is supported by the dual axle assembly 100. In the actual practice of the invention frame 162 will have a completely different appearance depending upon the type of vehicle with which the dual axle assembly is used.

The drag link forward end 166 has an opening 168 illustrative of means by which the drag link is attached to the frame portion 162A that preferably is in a pivotal way, such as by the use of a spherical bearing indicated diagrammatically by the numeral 170.

The rearward end 172 of the drag link is pivotally attached to the forward axle housing 102 by means of trunnion members 174 and 176 affixed to and extending forwardly of the forward axle housing. The drag link rearward end 172 is pivotally affixed to the trunnion members 174 and 176 about a common horizontal axis so as to permit drag link 166 flexibility in a vertical plane. Rather than being pivotally attached to forward axle housing 102, drag link rearward end 172 may be rigidly secured to the axle housing.

Affixed to the upper surface of the forward axle housing 102 is a trunnion member 178 and to the rearward axle housing a trunnion member 180. Matching these are brackets 182 and 184 extending downwardly from truck frame 162. A first cross link arm 186 pivotally connects trunnion 178 with bracket 182 and a second cross link arm 188 pivotally connects trunnion member 180 with bracket 184. The cross link arms 186 and 188 permit frame 162 to be displaced elevationally relative to the forward and rearward axle housings but, at the same time, maintains the axle housings and thereby the entire dual axle assembly 100 underneath and in supporting relationship relative to the frame.

Means must be provided to spring support the frame relative to the dual axle assembly 100. For this purpose, spaced apart trunnions 190 and 192 are affixed to and extend rearwardly from the forward axle housing 102. In like manner, spaced apart trunnions 194 and 196 are affixed to and extend forwardly of rearward axle housing 108.

As shown in FIG. 7, a lateral cross-member 198 is supported by frame 162 and has opposed vertically downwardly extending plates 200, only one of which is seen. Pivotally extending between trunnion member 194 and plate 200 is a strut member 202 of the type as previously described with reference to the element 80 of FIGS. 3 and 4. The strut member 202 is pivotally secured at the lower end to trunnion 194 and the upper end to plate 200. In like manner, a second strut member 204 extends from plate 200 to trunnion member 190. While not shown, third and fourth strut members are employed supporting the opposite ends of axle housings and connect with trunnions 192 and 196.

The dual axle assembly 100 has several advantages over the of known types of dual axle systems for large load carrying vehicles. First, the assembly is self absorbing as far as rotational torque due to propulsion and braking is concerned. As previously described with reference to the dual axle assembly of FIGS. 1 through 4, torque is self cancelling and substantially little torque, whether motive or braking, is transferred from the assembly to frame 162. This permits drag link 164 to, if desired, be pivotal on each end since structural coupling members are not required to resist torque as in the usual case with axle assemblies. Since drag link 164 is not required to resist torque it can be more simply and economically constructed and has less maintenance requirements.

A significant feature of the dual axle assembly is that each wheel assembly 142, 144, 150 and 152 is free to rise and fall vertically without imposing additional load on the other wheel assemblies. As shown in FIG. 6, there is an axis of pivotation 206 that passes through the point of universal coupling of the outer ends of each of the torque arms 114 and 128 represented by balls 124 and 136. The axis of pivotation 206 is at an angle relative to the vertical plane of the truck longitudinal axis 158. This allows axle 140 to pivot independently of the pivotation of axle 148 and vice versa, so that the weight borne by each wheel assembly remains substantially constant, regardless of the vertical displacement of the wheel assemblies caused by uneven terrain over which the vehicle travels.

The entire assembly 100 can be very simply and easily uncoupled from a vehicle frame for repair, maintenance and replacement, and then easily recoupled to the frame to thereby simplify maintenance and repair requirements.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A dual axle assembly for large off road vehicles comprising:
    an elongated vehicle frame having a longitudinal frame axis;
    a forward axle housing having opposed ends and a forward longitudinal axle axis;
    a first torque arm rearwardly extending from said forward axle housing;
    a rearward axle housing having opposed ends and a rearward longitudinal axle axis;
    a second torque arm forwardly extending from said rearward axle housing, the first and second torque arms being generally parallel to and spaced apart from each other, the first torque arm having an outer end pivotally affixed to said rearward axle housing and the second torque arm having an outer end pivotally affixed to said forward axle housing, said first torque arm being of a generally right angle triangular configuration when taken in a horizontal plane and having a hypotenuse side, the first torque arm having a wide base portion rigidly affixed to said forward axle housing centrally between said forward axle housing opposed ends and a narrower said outer end pivotally affixed to said rearward axle housing at a point of attachment adjacent one of said rearward axle opposed ends, and wherein said second torque arm is also of generally right angle triangular configuration when taken in a horizontal plane and having a hypotenuse side, the second torque arm having a wide base portion rigidly affixed to said rearward axle housing centrally between said rearward axle housing opposed ends and a narrower said outer end pivotally affixed to said forward axle housing at a point of attachment adjacent one of said forward axle housing opposed ends, the hypotenuse sides of said torque arms being closely spaced from and substantially parallel to each other;
    means to spring support said forward and rearward axle housing to said frame in substantially vertical spaced apart parallel planes that are substantially perpendicular to the vertical plane of said frame longitudinal axis; and
    a wheel structure supported at each said opposed ends of each said axle housing.

2. A dual axle assembly according to claim 1 wherein said means to spring support said forward and rearward axle housings includes:
    a first pair of spaced apart spring support means interposed between attachment points on said forward axle housing and said frame; and
    a second pair of spaced apart support means interposed between attachment points on said rearward axle housing and said frame.

3. A dual axle assembly according to claim 1 wherein said means to support said axle housing to said frame includes drag link means having one end pivotally affixed to said frame and one end affixed to said forward axle housing.

4. A dual axle assembly according to claim 2 wherein each said spring support means is in the form of a telescopically compressible strut member.

5. A dual axle assembly according to claim 1 wherein said outer ends of said first and second torque arms are pivotally affixed to said rearward and forward axle housings respectively by ball joint means.

6. A dual axle assembly according to claim 1 wherein said wheel structures supported at each said opposed ends of each of said axle housings are pivotally supported and including;
    steerage means for simultaneously pivoting said wheel structures for steering purposes.

* * * * *